United States Patent
Werner et al.

(10) Patent No.: US 9,102,328 B2
(45) Date of Patent: Aug. 11, 2015

(54) MOTOR VEHICLE HAVING A HYBRID DRIVE AND METHOD FOR SELECTING AN ELECTRIC MACHINE AND/OR A STARTER FOR STARTING A COMBUSTION ENGINE

(75) Inventors: Martin Werner, Gerolfing (DE); Michael Schneider, Pfünz (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 13/883,212

(22) PCT Filed: Oct. 27, 2011

(86) PCT No.: PCT/EP2011/005414
§ 371 (c)(1),
(2), (4) Date: May 2, 2013

(87) PCT Pub. No.: WO2012/059196
PCT Pub. Date: May 10, 2012

(65) Prior Publication Data
US 2013/0231817 A1     Sep. 5, 2013

(30) Foreign Application Priority Data
Nov. 3, 2010   (DE) .......................... 10 2010 050 123

(51) Int. Cl.
*B60W 20/00* (2006.01)
*B60K 6/48* (2007.10)
(Continued)

(52) U.S. Cl.
CPC .................. *B60W 20/40* (2013.01); *B60K 6/48* (2013.01); *B60W 10/06* (2013.01); *B60W 10/08* (2013.01);
(Continued)

(58) Field of Classification Search
CPC ..... B60W 20/00; B60W 10/06; B60W 10/08; B60W 10/02; B60W 2510/0638; B60W 2510/0685; B60W 30/192; B60W 2710/0644; B60W 2710/083; B60W 30/18027; B60W 2710/027; B60K 6/52; B60K 6/543; B60K 2001/003; B60K 2006/262; B60K 28/16; B60K 6/26; B60K 6/44; B60K 2006/541

USPC ............ 701/22, 80, 112, 113, 110; 477/5, 20; 180/65.25, 65.285, 65.265, 293

See application file for complete search history.

(56) References Cited

U.S. PATENT DOCUMENTS 5,982,045 A * 11/1999 Tabata et al. ..................... 290/17
6,177,734 B1 * 1/2001 Masberg et al. ................ 290/31
(Continued)

FOREIGN PATENT DOCUMENTS

| CN | 1927612 | 3/2007 |
|---|---|---|
| CN | 1962334 | 6/2007 |

(Continued)

OTHER PUBLICATIONS

International Search Report issued by the European Patent Office in International Application PCT/EP2011/005414 on Mar. 15, 2012.
(Continued)

*Primary Examiner* — John R Olszewski
*Assistant Examiner* — Truc M Do
(74) *Attorney, Agent, or Firm* — Henry M. Feiereisen LLC

(57) ABSTRACT

A motor vehicle with a hybrid drive includes a combustion engine, an electric machine, which can be operated as a motor and used for starting the combustion engine, a control unit, and a starter which can be used for starting the combustion engine. When startup of the combustion engine is imminent, the control unit is designed to select the electric machine and/or the starter for starting the combustion engine depending on at least one operating parameter of the motor vehicle which describes the drive dynamics requirement and/or the torque requirement for the hybrid drive and/or a requirement of a controller of the motor vehicle.

8 Claims, 1 Drawing Sheet

(51) Int. Cl.
*B60W 10/06* (2006.01)
*B60W 10/08* (2006.01)
*B60W 30/192* (2012.01)
*F02N 11/00* (2006.01)

(52) U.S. Cl.
CPC .......... *B60W 30/192* (2013.01); *F02N 11/006* (2013.01); *B60W 20/00* (2013.01); *B60W 2510/0685* (2013.01); *B60W 2540/10* (2013.01); *B60W 2540/106* (2013.01); *B60W 2540/12* (2013.01); *F02N 2200/021* (2013.01); *F02N 2200/101* (2013.01); *F02N 2200/102* (2013.01); *F02N 2300/2002* (2013.01); *Y02T 10/6221* (2013.01); *Y02T 10/6286* (2013.01); *Y10S 903/903* (2013.01)

(56) References Cited

U.S. PATENT DOCUMENTS

| | | | |
|---|---|---|---|
| 6,453,865 B2* | 9/2002 | Hirose et al. | 123/179.4 |
| 6,752,112 B1* | 6/2004 | Ohata et al. | 123/179.4 |
| 6,769,389 B2 | 8/2004 | Tamai et al. | |
| 7,180,201 B2 | 2/2007 | Kusumi et al. | |
| 7,975,791 B2 | 7/2011 | Nozaki et al. | |
| 8,136,497 B2* | 3/2012 | Gibson et al. | 123/179.4 |
| 8,297,249 B2* | 10/2012 | Seufert et al. | 123/179.3 |
| 2001/0018903 A1* | 9/2001 | Hirose et al. | 123/179.4 |
| 2002/0145287 A1* | 10/2002 | Izumiura et al. | 290/40 C |
| 2004/0099234 A1* | 5/2004 | Tamai et al. | 123/179.3 |
| 2004/0133333 A1* | 7/2004 | Surewaard et al. | 701/99 |
| 2004/0200448 A1* | 10/2004 | Kojima et al. | 123/179.3 |
| 2005/0017580 A1* | 1/2005 | Cikanek et al. | 303/191 |
| 2005/0051371 A1* | 3/2005 | Masterson | 180/65.2 |
| 2005/0082098 A1* | 4/2005 | Ito et al. | 180/65.2 |
| 2005/0090365 A1* | 4/2005 | Tamai et al. | 477/5 |
| 2005/0113211 A1* | 5/2005 | Surewaard et al. | 477/92 |
| 2005/0131622 A1* | 6/2005 | Braun et al. | 701/113 |
| 2005/0274346 A1* | 12/2005 | Fukuzawa et al. | 123/179.25 |
| 2006/0086545 A1* | 4/2006 | Ito et al. | 180/65.2 |
| 2007/0078040 A1* | 4/2007 | Nobumoto et al. | 477/70 |
| 2007/0080006 A1* | 4/2007 | Yamaguchi | 180/65.3 |
| 2007/0084429 A1* | 4/2007 | Taki et al. | 123/179.4 |
| 2007/0102211 A1* | 5/2007 | Nozaki et al. | 180/65.7 |
| 2007/0113814 A1* | 5/2007 | Tamai et al. | 123/179.3 |
| 2007/0157899 A1* | 7/2007 | Seufert et al. | 123/179.25 |
| 2008/0053390 A1* | 3/2008 | Rizoulis et al. | 123/179.25 |
| 2008/0077308 A1* | 3/2008 | Laubender | 701/113 |
| 2008/0109150 A1* | 5/2008 | Pfohl et al. | 701/113 |
| 2008/0127935 A1 | 6/2008 | Park | |
| 2008/0258474 A1* | 10/2008 | Tabata et al. | 290/40 A |
| 2008/0261770 A1* | 10/2008 | Tabata et al. | 477/5 |
| 2009/0224557 A1 | 9/2009 | Reynolds et al. | |
| 2009/0250942 A1* | 10/2009 | Odagiri et al. | 290/38 R |
| 2010/0083926 A1* | 4/2010 | Okumoto et al. | 123/179.4 |
| 2010/0106394 A1* | 4/2010 | Seufert et al. | 701/113 |
| 2010/0174465 A1* | 7/2010 | Gibson et al. | 701/70 |
| 2010/0264670 A1* | 10/2010 | Usami et al. | 290/38 R |
| 2010/0279818 A1* | 11/2010 | Soliman et al. | 477/5 |
| 2010/0282200 A1* | 11/2010 | Notani et al. | 123/179.3 |
| 2010/0299053 A1* | 11/2010 | Okumoto et al. | 701/113 |
| 2010/0304926 A1* | 12/2010 | Soliman et al. | 477/38 |
| 2011/0040432 A1* | 2/2011 | Kaltenbach et al. | 701/22 |
| 2011/0053735 A1* | 3/2011 | Lewis et al. | 477/99 |
| 2011/0071001 A1* | 3/2011 | Yu et al. | 477/203 |
| 2011/0098151 A1 | 4/2011 | Ziemer | |
| 2011/0132307 A1* | 6/2011 | Patterson et al. | 123/179.3 |
| 2011/0132308 A1* | 6/2011 | Liu et al. | 123/179.4 |
| 2011/0184626 A1* | 7/2011 | Mauritz et al. | 701/102 |
| 2011/0196570 A1* | 8/2011 | Nakamura | 701/29 |
| 2012/0010792 A1* | 1/2012 | Nedorezov et al. | 701/54 |
| 2012/0032453 A1* | 2/2012 | Nakamura | 290/38 R |
| 2012/0122630 A1 | 5/2012 | Huber et al. | |
| 2013/0116088 A1* | 5/2013 | Gibson et al. | 477/80 |

FOREIGN PATENT DOCUMENTS

| | | |
|---|---|---|
| DE | 103 46 919 | 7/2004 |
| DE | 102005018598 | 12/2005 |
| DE | 102006013502 | 9/2007 |
| DE | 102007007925 | 8/2008 |
| DE | 102007061895 | 6/2009 |
| DE | 102009011628 | 10/2009 |
| DE | 102008002381 | 12/2009 |
| DE | 102008002666 | 12/2009 |
| DE | 102008027658 | 12/2009 |
| EP | 0 989 300 | 3/2000 |
| JP | 2004-339943 | 12/2004 |

OTHER PUBLICATIONS

Chinese Search Report issued in counterpart Chinese Patent Application No. 201180053253X on Mar. 27, 2015.
English translation of Chinese Search Report issued in counterpart Chinese Patent Application No. 201180053253X on Mar. 27, 2015.

\* cited by examiner

MOTOR VEHICLE HAVING A HYBRID DRIVE AND METHOD FOR SELECTING AN ELECTRIC MACHINE AND/OR A STARTER FOR STARTING A COMBUSTION ENGINE

CROSS-REFERENCES TO RELATED APPLICATIONS

This application is the U.S. National Stage of International Application No. PCT/EP2011/005414, filed Oct. 27, 2011, which designated the United States and has been published as International Publication No. WO 2012/059196 and which claims the priority of German Patent Application, Serial No. 10 2010 050 123.9, filed Nov. 3, 2010, pursuant to 35 U.S.C. 119(a)-(d).

BACKGROUND OF THE INVENTION

The invention relates to a motor vehicle with a hybrid drive, which includes a combustion engine, an electric machine operable as a motor and usable for starting the combustion engine, a controller and a starter usable for starting the engine. The invention also relates to a method for selecting an electric machine and/or a starter for starting a combustion engine in a motor vehicle having a hybrid drive.

Vehicles equipped with a hybrid drive and having both a combustion engine and an electric traction machine are well known in the art and advantageous due to their energy-saving mode of operation. Unlike motor vehicles equipped only with combustion engines, motor vehicles with hybrid vehicles are known in which the combustion engines are started with the electric machine via a drag and/or pulse start. For example, in a drag start, the separating clutch between the combustion engine and the electric machine is briefly engaged so that the electric machine "drags" the motor. Conversely, in a pulse start, the speed of the electric motor is usually briefly increased so as to transfer this "pulse" to the combustion engine after engaging the clutch and to bring the combustion engine to the correct firing position. However, mixed forms of these two types are also possible.

When the combustion engine is running, it is known in many hybrid vehicles to configure the electric machine so as to operate also as a generator, i.e., the electric machine can be used both as a motor and as a generator.

Disadvantageously, drag and/or pulse starts of the combustion engine with the electric traction machine require a complex control system to prevent jerking at the start-up. In addition, torques must be continuously provided, for example, to switch on the combustion engine even when with significant acceleration is provided by the electric machine. DE 103 46 919 A1 describes a hybrid vehicle which should allow to start a combustion engine in an emergency, for example, when the high-voltage battery operating the electric machine has a very low charge state. For this purpose, a starter motor powered by a low voltage of typically 12 V is provided. When the battery or the battery unit of the system with the higher voltage is insufficiently charged, but the low-voltage battery of 12 V is sufficiently charged, the starter motor can be used with the 12 V battery to start the combustion engine.

However, this cannot get around the aforedescribed disadvantages.

SUMMARY OF THE INVENTION

It is therefore an object of the invention to provide an approach which allows the combustion engine to generally start quickly and jerk-free in all driving situations.

This object is attained according to the invention with a motor vehicle of the aforementioned type in that, in an impending start of the combustion engine, the controller is configured to select the electric machine and/or the starter for starting the combustion engine depending on at least one operating parameter of the motor vehicle descriptive of the required vehicle dynamics and/or the torque required from the hybrid drive and/or a request from a controller of the motor vehicle.

The present invention therefore also proposes to equip a hybrid vehicle with a conventional starter which includes a starter motor, in addition to the electric machine which can operate as a traction machine and advantageously also as a generator. The starter and the starter motor, respectively, can advantageously be operated in motor vehicles by using a low-voltage battery, such as a conventional 12 V battery. However, it would also be conceivable to use a starter operated in a different way, such as a starter operated at an intermediate voltage, for example 78 V, which can be powered via a DC-DC converter from a high voltage network, and the like. Finally, it would also be conceivable to design a starter with a starter motor so that it can be operated in the onboard high-voltage system of the motor vehicle itself. The voltage, at which the starter can be operated, can hence be freely selected within the context of the present invention.

Within the context of the present invention, however, the additional starter is now not (only) is provided as a safety measure, but the starter, the electric machine or even of the starter and the electric machine may be used for starting the combustion engine depending on the operating strategy.

It is therefore specifically proposed to carry out the selection depending on the operational parameters and communication signals from other controllers that describe the operating strategy. For example, the starter may be used at a high vehicle dynamics requirement, when fast acceleration or a rapid switchover into acceleration operation is desired, i.e. when threshold values for the corresponding operating parameters are exceeded, since the combustion engine can then start faster and thus the vehicle dynamics requirement can be satisfied more quickly. Similarly, the torque requirement to the hybrid drive may be considered, since with a higher torque requirement to be satisfied by the electric machine, a torque may have to be additionally made available in order to actually switch on the combustion engine. When the starter is used in these situations where the electric machine is already operating at full capacity, then not only is the combustion engine switched on quickly, but jerking caused by the drag and/or pulse start is also prevented. It should be noted here that the term torque requirement to the hybrid drive within the present invention refers to the actually required torque to bring the engine to its firing position, meaning that it may also refer to the torque required by the combustion engine from the electric machine and the starter, respectively, in order to make the final selection, which will be discussed in more detail below.

Overall, for example at least one vehicle dynamics requirement variable and/or at least one torque requirement variable may be considered, which can be determined from different operational parameters, for example in relation to the pedal position, the speed and/or the selected gear. A decision can now be made, based on or in functional dependence of the threshold value, which system (i.e. the electric starter or the electric machine) is to be used for startup, or if both are used, in which proportion both contribute. The different variables may of course also be linked, as is generally known, optionally also with the requests obtained from other controllers which can advantageously be prioritized.

These requirements, which are transmitted to the controller, for example by other vehicle systems or their controllers, describe situations outside the power generating system which may show whether the starter or the electric machine appear to be more effective. In particular, the gearbox should be mentioned here, as for example jerking of the motor vehicle can be prevented at a low speeds or in a low gear, when the starter is used for starting the combustion engine instead of the electric machine.

With the present invention, the combustion engine may advantageously be started by the electric machine or the starter motor, so that in particular when using the starter, the power and the torque from the electric traction machine is fully available for propulsion. Jerking of the vehicle can thus be prevented and/or the vehicle can respond more quickly to the driver's wishes depending on the current operating strategy and the requirements from the driver.

In a specific embodiment of the present invention, the controller may be configured to select the system used to start the combustion engine depending on the position of an accelerator pedal and/or the dynamics of operating an accelerator pedal and/or a brake pedal, in particular the gradient, and/or depending on a current position of the engine cylinder of the combustion engine. Of course, other and/or additional operating parameters describing the dynamics or the torque requirement of the vehicle may be considered so that, for example, the speed or an engaged gear can also be taken into consideration.

Advantageously, the controller may be configured to use the electric machine at an accelerator pedal position corresponding to a low acceleration requirement and/or an accelerator pedal position corresponding to a low vehicle dynamics requirement and to use the starter to start the combustion engine at an accelerator pedal position descriptive of a high acceleration requirement and/or at an accelerator pedal position descriptive of a high vehicle dynamics requirement and/or at a rapid change from a brake pedal to the accelerator pedal. For an actual implementation of such requests, threshold values are stored in the controller, with the actual values depending on the specific motor vehicle. Thus, when the accelerator pedal is depressed very far, a torque exceeding the threshold value is already required from the hybrid drive, so that ideally the starter is used to possibly avoid a situation where the electric machine needs to provide torques for starting the combustion engine. This may, of course, be considered together with the accelerator pedal dynamics, whereby, for example, a high gradient exceeding a threshold value, i.e. a quick depression of the accelerator pedal, would suggest that the driver requests a strong acceleration as quickly as possible, so that the combustion engine should be quickly switched on, which also suggests using of the starter. Also, the fact that a brake pedal is released quickly to switch to the accelerator pedal can indicate a desired high dynamics and thus rapid switching of the engine by the starter. Such operating parameters may be detected, for example, by a suitable sensor on the pedals. The corresponding sensor data are processed by the controller to determine, for example, the aforementioned vehicle dynamics requirement variables and/or the torque requirement variable and to make the selection accordingly.

Alternatively, an operating parameter describing a driving style and/or a driver's request may be considered as the operating parameters descriptive of the vehicle dynamics requirement. The selection of whether to start with the electric machine and/or the starter may also be made as a function of the driver's subjective expectations of the dynamics of the vehicle, which could still be derived from operating parameters. In a simple embodiment, an operating parameter descriptive of a selection of an operating program of the motor vehicle may be used. Motor vehicles sometimes offer various operating programs, such as a sporty operating program, a comfortable operating program and/or an effective operating program, especially for minimizing energy consumption. Such operating programs typically include a set of operating parameters to be set for vehicle systems, wherein for example a faster response of the engine, brakes and steering can be set in a sporty operating program or operating mode. Within the context of the present invention, thresholds for using the starter may be lowered when a sporty operating program is set, so that the energy from the electric machine is more frequently available to enhance the vehicle dynamics.

However, it would also be conceivable within this context to monitor the driver's driving style, for example, to classify the driver as more sporty or as a driver with a driving style oriented more towards comfort. Such approaches, which analyze various measurement and operating parameters of the motor vehicle to determine at least one driver information descriptive of the type of driver are generally known, so that the obtained driver information may be included as an operating parameter in the selection decision for starting the engine. The driver's expectations can thus also be taken into consideration.

Preferably, a transmission controller may be provided as an additional controller, with the transmission controller configured to transmit to the controller a request for selection of the starter at a low rotation speed and/or depending on the state of a starting clutch. As mentioned above, overall states of the motor vehicle are also conceivable which may result in noticeable effects in the motor vehicle, such as a jerking, when the combustion engine is started with the electric machine. This may for example occur when the transmission has a low rotation speed or with certain states of the starting clutch. In such a situation, the transmission controller may send a request to the controller, indicating that starting of the combustion engine by the starter is imminent. Similar conditions and situations are also conceivable with respect to other controllers and other vehicle systems.

In another embodiment of the invention, the controller is configured to take into consideration characteristic curve field associated with at least one other operating parameter, in particular the engaged gear and/or the current speed of the motor vehicle and/or a set starting variant as at least one parameter affecting the selection of the starter or the electric machine for starting the combustion engine. Such information that can be determined particularly as a function of the gear and speed, but also as a function of a set starting variant and starting type, i.e. whether the starter or the electric machine is to be used, may be determined, for example, from measurements and/or from test drives. Whenever jerking is detected, selection of the starter may be required as a result of the parameter affecting selection of the starter or the electric machine for starting the combustion engine.

In another embodiment of the present invention, a sensor for measuring the cylinder position of the engine, in particular a crankshaft sensor, may be provided. A crankshaft sensor which tracks the revolutions of the crankshaft and thus the position of the combustion engine is frequently used to determine a cylinder position of the engine. It can be determined based on the measurement data from such a sensor how much the torque would be required to move the combustion engine to the compression state where ignition is possible. When a large torque is required to achieve this state, the starter may carry out the starting process instead of the electric machine, since such a large torque is more noticeably in the motor vehicle. It should be noted here that, when no information about the current rest position of the combustion engine is available, it may be assumed that a maximum torque is required ("worst case"). In this situation, the starter may then always be used to start the combustion engine.

As mentioned previously, the combustion engine may be started with the electric machine by a drag start and/or a pulse start. These are common approaches for taking advantage of the torque from the electric machine operated as a motor in order to bring the combustion engine in the correct firing position.

A low-voltage battery which has a lower voltage than a high-voltage battery used to supply the electric machine may be provided to supply the starter. For example, the starter may then be part of an onboard low-voltage system operating at a voltage of for example 12 V, as is customary in motor vehicles. An onboard high-voltage system for the electric machine which is fed from a high-voltage battery is frequently implemented in parallel, with voltages of, for example, up to 600 V.

In a particularly advantageous embodiment of the present invention, the controller may additionally be configured to use the electric machine for starting the combustion engine when the charge state of the low-voltage battery is low and to use the starter for starting the combustion engine when the charge state of the high-voltage battery is low. Accordingly, the charge states the batteries may be taken into consideration when selecting a suitable system for the starting process. In this way, the starter is ultimately still used as a "safety system", so that the combustion engine may be started even when the high-voltage battery is depleted. Similarly, when the energy in the low-voltage battery is no longer sufficient, the electric machine can be used for safety reasons, even when it would be more appropriate to use the starter in the current driving situation. In particular, embodiments are conceivable wherein both batteries are used to start the combustion engine of the motor vehicle when both batteries have a low charge state. The combustion engine can then be started even though the energy in each of the two batteries alone would not be sufficient.

In addition to the motor vehicle, the present invention also relates to a method for selecting an electric machine and/or a starter for starting a combustion engine in a motor vehicle having a hybrid drive, which is characterized in that the selection is made in response to at least one operating parameter of the motor vehicle describing the vehicle dynamics and/or the torque requirement from the hybrid drive and/or a request from a controller of the motor vehicle. It is therefore also proposed in the method to take into account the current operating strategy of the motor vehicle so as to ensure a rapid startup of the combustion engine, in particular in response to a driver's wish for a high dynamic, and to on the other hand prevent jerking when torque is diverted from the electric machine or other noticeable non-uniform running of the motor vehicle. At the same time, information from other vehicle systems may be considered via their respective controllers, for example a request from a transmission controller.

The entire description relating to the motor vehicle according to the invention can be applied similarly to the method of the invention, so that the benefits described therein can then also be attained.

BRIEF DESCRIPTION OF THE DRAWING

Further advantages and details of the present invention will become apparent from the following description of exemplary embodiments and from the drawings. The drawing show in.

DETAILED DESCRIPTION OF PREFERRED EMBODIMENTS

Figure 1:
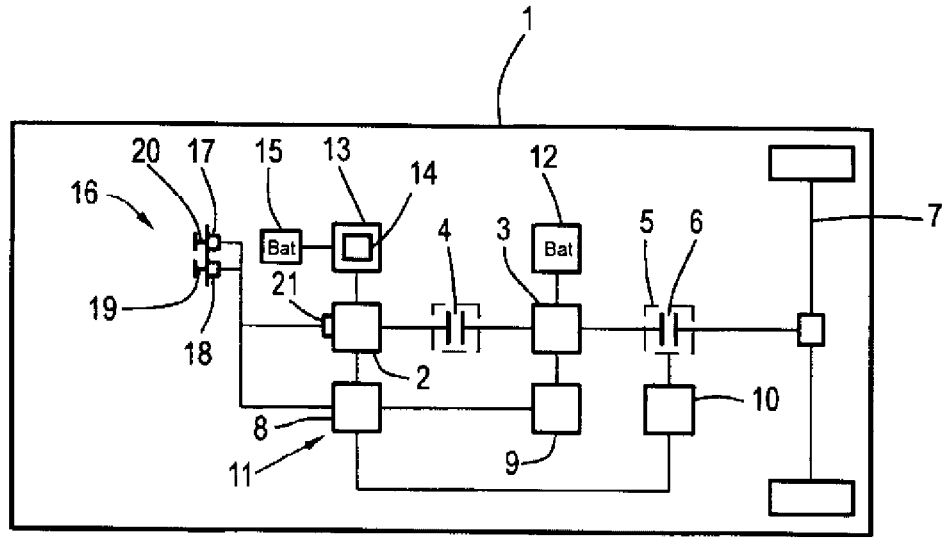
FIG. 1 a motor vehicle according to the present invention.

FIG. 1 shows a schematic diagram of a motor vehicle 1 according to the present invention with a hybrid drive. For this purpose, the motor vehicle 1 includes, in addition to a conventional combustion engine 2, also a traction electric machine 3 that can be operated either as a motor or as a generator. The two drive machines can be connected via a clutch 4.

The produced drive power, i.e. the propulsion, is transmitted via a transmission 5 with a starting clutch 6 to a drive shaft 7.

The various components in the drive train of the motor vehicle 1 are controlled by controllers, wherein in this case a controller 8 is associated with the combustion engine 2, and a controller 9 is associated with the electric machine 3. The transmission 5 is controlled by a transmission controller 10.

In the present case, the controller 8 forms a master controller for the engine of the motor vehicle 1. It will be understood that other embodiments are conceivable wherein the controllers 8 and 9 are integrated into a single controller. The controllers 8 and 9 may be regarded as a control unit 11.

While the combustion engine 2 in the motor vehicle 1 may be started by a drag and/or to pulse start using the electric machine 3 which is supplied from a high-voltage battery 12, the motor vehicle 1 also includes a conventional low-voltage starter 13 with a starter motor 14, which may be part of an onboard low-voltage network operated by a low-voltage battery 15, for example, at an operating voltage of 12 V. The control unit 11 is now configured to select in an upcoming startup of the engine 2, whether the combustion engine 2 should be started by the starter 13 and/or by the electric engine 3. For this purpose, various operating parameters and request signals from other controllers, for example, from the transmission controller 10, are taken into consideration. In the present example, the operating parameters entering the calculations carried out, for example, in the controller 8, are sensor data from sensors 17, 18 disposed on pedals 16, which measure for example the current position and dynamics, in particular the gradient, of the accelerator pedal 19 and of the brake pedal 20 and transmit these data to the controller 8. In addition, the controller 8 receives the measurement data from a crankshaft sensor 21, from which the current rest position of the engine 2 can be inferred. Of course, other operating parameters or the data from additional sensors may be included, for example, the speed of the motor vehicle, the engaged gear and the like, from which a (co-) determining variable the system for starting the combustion engine 2 can be determined via, for example, a characteristic curve field. Lastly, the controller 8 may still consider the charge state of the batteries 15, 12 when selecting the system for starting the engine 2.

Figure 2:
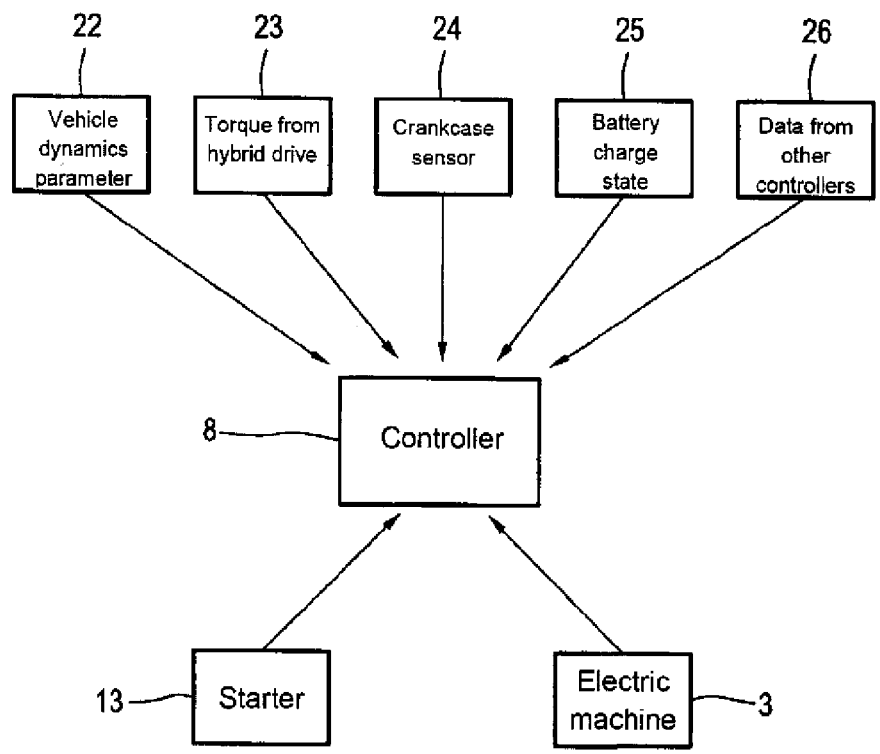
FIG. 2 a diagram of the selection strategy according to the present invention.

More specifically, the diagram of FIG. 2 illustrates the approach according to the invention. It is evident that the operating parameters 22 describing the vehicle dynamics requirements are considered first. For example, a vehicle dynamics variable describing the desired dynamics—meaning the driver's desire for a quick response of the motor vehicle 1—may be determined from the considered operating parameters 22, which are then compared with one or more threshold values. For example, when a high vehicle dynamics is required, the starter 13 can be used, because the starter 13 provides faster startup of the engine 2. Such information can be derived, for example, from the gradient of the accelerator operation and/or a rapid switchover from the brake pedal 20 to the accelerator pedal 19.

In addition, operating parameters 23 are taken into account, which describe the torque required from the hybrid drive, from which a torque requirement variable to be compared with at least one threshold value can be determined. For example, the position of the accelerator pedal enters here as an operating parameter. Situations are then detected which would result in a significant fluctuation of the power used to propel the electric machine 3, so for example jerking and the like. If this can be expected, then the starter 13 can also be used.

Furthermore, the measurement data 24 from the crankshaft sensor 21 are taken into consideration, because they allow an estimate of the torque required for moving the cylinders of the combustion engine 2 to the firing position. The starter 13 may also be selected when a large torque is required or when the current position of the cylinders of the combustion engine 2 is unknown.

Moreover, requests 26 from other controllers, for example, from the transmission controller 10, may be taken into consideration, for example the requirements 26. For example, a drag start may cause jerking at a low rotation speed. Accordingly, the transmission 26 may send to the controller 8 a request for use of the starter 13. Similarly, the state of the starting clutch 6 may be considered which may also cause jerking when the clutch 6 is engaged or disengaged during a drag and/or pulse start.

Finally, the charge states 25 of the batteries 12, 15 may also be considered with the present invention. For example, the starter 13 may be used when the high-voltage battery 12 has an excessively low charge state, and vice versa.

The controller 8 which forms a part of the control unit 11 controls the starter motor 13 and/or the electric machine 3, as shown in FIG. 2.

It should be noted here that the measurement data 24 can ultimately be interpreted as operating parameters 23 describing the torque required from the hybrid drive, because this additional torque must be supplied by the electric machine 3.

Parameters describing the desire of the driver can generally also be taken into consideration as operating parameters 22 describing the vehicle dynamics requirements, for example an operating program set by the driver and/or a typical driving style of the driver, which can be determined for example from data recorded while driving. Such operating parameters 22 may affect threshold values with which other operating parameters 22, 23 are compared.

The invention claimed is:

1. A motor vehicle with a hybrid drive, the motor vehicle comprising:
   a combustion engine,
   an electric machine configured to be operated as a motor and to start the combustion engine,
   a starter configured to start the combustion engine, and
   a control unit configured to select, in an impending startup of the combustion engine, at least one of the electric machine and the starter to start the combustion engine, said selection depending on at least one operating parameter of the motor vehicle selected from a dynamics of operating the accelerator pedal or a brake pedal, or both, and a current cylinder position of the combustion engine, and an additional operating parameter depending on at least one characteristic curve field associated with an engaged gear,
   wherein the control unit is configured to select the electric machine to start the combustion engine when the dynamics of operating the accelerator pedal describes a low vehicle dynamics requirement, and to select the starter to start the combustion engine in at least one of the following situations: the dynamics of operating the accelerator pedal describes a high vehicle dynamics requirement, and during a quick switch from the brake pedal to the accelerator pedal.

2. The motor vehicle of claim 1, wherein the at least one operating parameter further describes at least one of a driving style and a driver's intent.

3. The motor vehicle of claim 1, further comprising a transmission controller configured to send to the control unit a request for selecting the starter dependent on a low rotation speed of a vehicle transmission and on a state of a starting clutch.

4. The motor vehicle of claim 1, further comprising a sensor for measuring a cylinder position of the combustion engine.

5. The motor vehicle of claim 4, wherein the sensor is a crankshaft sensor.

6. The motor vehicle of claim 4, wherein the combustion engine is configured to be started by the electric machine with at least one of a drag start and a pulse start.

7. The motor vehicle of claim 1, further comprising a high-voltage battery supplying the electric machine and a low-voltage battery having a lower voltage than the high-voltage battery, with the low-voltage battery supplying the starter,
   wherein the electric machine starts the combustion engine when a charge state of the low-voltage battery is low, and the starter starts the combustion engine when a charge state of the high-voltage battery is low.

8. A method for starting a combustion engine in a motor vehicle, comprising selecting, in an impending startup of the combustion engine, at least one of an electric machine configured to be operated as a motor and a starter to start the combustion engine, said selection depending on at least one operating parameter of the motor vehicle selected from a dynamics of operating the accelerator pedal or a brake pedal, or both, and a current cylinder position of the combustion engine, and an additional operating parameter depending on at least one characteristic curve field associated with an engaged gear, wherein the electric machine is selected to start the combustion engine when the dynamics of operating the accelerator pedal describes a low vehicle dynamics requirement, and the starter is selected to start the combustion engine in at least one of the following situations: the dynamics of operating the accelerator pedal describes a high vehicle dynamics requirement, and during a quick switch from the brake pedal to the accelerator pedal.

* * * * *